3,661,946
PHOSPHATIDE EXTRACTION
Hermann Pardun, Kleve, Germany, assignor to Lever Brothers Company, New York, N.Y.
No Drawing. Filed Sept. 17, 1968, Ser. No. 760,350
Claims priority, application Germany, Sept. 19, 1967, P 16 92 568.1
Int. Cl. C07f 9/02
U.S. Cl. 260—403                                       8 Claims

ABSTRACT OF THE DISCLOSURE

In the separation of vegetable phosphatide fractions from mixtures containing them, by extracting the mixture with a lower aliphatic alcohol containing from 1 to 3 carbon atoms, the efficiency of the extraction process, expressed as percentage recovered choline lecithin present in the alcohol-soluble choline lecithin-enriched fraction, is increased to an important degree without adversely affecting the selectivity, expressed as the weight ratio of choline lecithin to cephalin in the same fraction, by carrying out the extraction in the presence of from 5 to 30%, preferably 10 to 20%, by weight of the total amount of phosphatides present in the mixture to be extracted of a monoglyceride which is liquid at the temperature of extraction.

---

This invention relates to a process for the separation of phosphatide fractions from mixtures containing them.

Vegetable phosphatide mixtures, in commerce often referred to as soya-, groundnut-, rapeseed-, etc. lecithin, are obtained as by-product in the production of vegetable oils. They possess emulsifying properties and are therefore applied as additives to such foodstuffs as contain fat in emulsified form, such as for example margarine, mayonnaise, chocolate and the like.

In water-free state such phosphatide mixtures consist of from 30 to 40% by weight of neutral triglyceride oil, of from 5 to 10% by weight of mono-, di- and trisaccharides, of from 50 to 60% by weight of various phosphatides and especially ethanolamine, serine, inositol and choline-phosphatide. Of these phosphatides the ethanol and serine phosphatides are together known under the name cephalin, whereas the name lecithin often is used specifically for the choline-phosphatide. In this specification the latter product will be designated as choline lecithin.

The emulsifying power of these mixtures, of which the phosphatides are to be considered the active components, is in many cases unsatisfactory. This is believed to be due to the fact that cephalin has a deleterious effect on the emulsifying properties of the choline lecithin by some kind of antagonistic action, for instance when used in margarine.

Accordingly, methods have been sought for avoiding this antagonistic action by separating the crude phosphatide mixtures into choline lecithin-enriched and cephalin-enriched fractions. Thus, the enriched choline lecithins obtained from the crude phosphatide mixture by treatment with lower-molecular alcohols frequently act as oil-in-water emulsifiers, while the enriched cephalins have the power of stabilising water-oil emulsions (see U.S. patent specification 2,849,318 and U.S. patent specification 2,724,649).

However, it has also been observed that enriched choline lecithins are excellent water-in-oil emulsifiers, for example in margarine (see U.S. patent specification 2,640,780 and French patent specification 1,403,578).

It was, furthermore, already known that the emulsifying properties of mixtures of alcohol-soluble fractions of plant phosphatides and mono-/diglycerides show a synergistic improvement in contrast with the emulsifying properties of the individual components (Canadian patent specification 532,392 and the corresponding U.S. patent specification 2,773,771).

Also it was already known that by the addition of from 2 to 6% of a glyceride oil as well as 2 to 8% of a liquid monoglyceride of oleic or linoleic acid plastic lecithin preparations can be converted to the liquid state (U.S. patent specification 2,777,817).

Furthermore, stable solutions of phosphatides in oils have already been prepared in which to these are added as solubilising agent 1% of a monoglycide, of which at least 50% of the total fatty acids are unsaturated (Belgian patent specification 641,831 and German patent application 1,173,778).

The methods applied for obtaining the above-mentioned enriched choline lecithin fractions, viz: extraction of the crude plant phosphatide mixtures with lower aliphatic alcohols, have the disadvantage that a substantial part of the choline lecithin remains in the alcohol-insoluble fraction.

It has now been unexpectedly found that in this extraction the efficiency (percentage of choline lecithin recovered present in the alcohol-soluble choline lecithin-enriched fraction) can be increased to an important degree without adversely affecting the selectivity (expressed as the weight ratio choline lecithin to cephalin present in the same fraction) by a process in which the crude phosphatide mixture is extracted with a saturated aliphatic alcohol containing 1 to 3 carbon atoms in the presence of from 5 to 30%, preferably 10 to 20%, by weight of the total amount of phosphatides present in the mixture to be extracted of a monoglyceride which is liquid at the temperature of extraction.

The crude phosphatide mixtures from which the phosphatide fractions are to be separated by the process according to the invention are those in which the ratio choline lecithin to cephalin is essentially the same as that in the mixture of phosphatides present in the natural vegetable oil from which the mixture has been obtained. Such crude mixtures are in the first place the so-called hydrated vegetable phosphatides, by which is meant vegetable phosphatides obtained by treating a crude phosphatide containing oil extracted from plants by pressing of the plant material or by means of a solvent, with a small amount of water, so that the phosphatides become hydrated and are precipitated.

Furthermore, phosphatide mixtures can be used obtained from the above-mentioned hydrated mixtures by any process in which the original ratio choline lecithin to cephalin has not been changed to an essential degree. Particularly suitable to be used in the process according to the invention are the phosphatide mixtures obtained from the hydrated phosphatides by gentle evaporation of all or most of the water under reduced pressure.

Quite generally monoglycerides suitable to be applied in the process according to the invention are those that are liquid at the temperature of extraction in particular monoglycerides of which at least 50% of the acyl groups are derived from unsaturated fatty acids having a chain length of at least 18 carbon atoms. Furthermore monoglycerides can be used in which at least part of the acyl group is derived from unsaturated hydroxy fatty acids.

The monoglycerides used as additives are for example the technical monoglycerides obtained by the known interesterification of liquid plant and animal oils with glycerol, which contain about 50% by weight of pure monoglycerides, 20 to 30% of diglycerides and 20 to 30% of triglycerides. In general the content of monoglyceride in mixtures of the kind that are applied in the process according to the invention should amount to about 40%. Preferably additives with still higher monoglyceride content are used, which for example, can be obtained by enrichment processes, known in themselves, from the above-named technical mixtures, so that the monoglyceride content can be from 95 to 100%. Suitable are, for example, monoglycerides which have been prepared from sunflower, maize, soyabean, safflower, linseed or fish oil, technical oleic acid, castor oil and the like, or mixtures thereof.

The alcohols employed in the process according to the invention are saturated aliphatic alcohols such as methanol, ethanol and isopropanol or mixtures of such alcohols. Preferably the alcohol is applied in a proportion of from 2 to 6 parts by volume of the phosphatide mixture to be extracted.

The alcohol used can be water free or contain up to 30%, preferably from 5 to 10% by volume of water.

With regard to the attainment of a sufficient sensitivity and yield, it is recommended to work at low temperatures, for example, from 0 to 10° C., with absolute alcohols, from 10 to 20° C., with alcohols that contain from 5 to 10% of water, and at higher temperatures with still more dilute alcohols. However, the proportion of water present in the total extraction mixture (crude phosphatide mixture plus monoglyceride, plus alcohol, plus water) should not be more than 20% by volume.

Furthermore, the temperature at which the extraction process is conducted should not exceed 70° C. in order to prevent the formation of dark-coloured by-product.

Due to the presence of monoglyceride in the extraction mixture the efficiency of the process is increased by from 10 to 30%, whereas the selectively, expressed by the weight proportion of choline lecithin to cephalin in the end product, which is between 4 to 1 and 7 to 1, remains unchanged.

The efficiency E, that is the percentage yield of extracted choline lecithin, based on the choline lecithin content of the crude starting lecithin, can be calculated according to the following formula:

$$E = \frac{\text{Grams extract} \times \text{percentage choline lecithin extract}}{\text{Grams crude phosphatide} \times \text{percent choline lecithin in crude phosphatide}} \times 100\%$$

E.g. if 150 grams crude soya lecithin with a content of 20% choline lecithin are extracted to give 30 grams of an extract with 40% choline lecithin and 10% cephalin, the efficiency is $$E = \frac{30 \times 40}{150 \times 20} \times 100\% = 40\%$$

By the process according to the invention there occurs, moreover, a fractionation of the technical monoglyceride in such a way that the chemically pure monoglycerides are enriched in the alcoholic extract, whereas the di- and triglycerides and the free fatty acids are enriched in the residue.

For this reason simple dilution of a choline lecithin-enriched fraction obtained by alcoholic extraction of a phosphatide mixture in the absence of monoglycerides never can give a product with an equally high content of lecithin and monoglycerides as a product obtained by the process according to the invention applied to the same phosphatide mixture.

A further unpredictable advantage of the process according to the invention consists in that it makes possible a continuous counter-current extraction by the distribution of components of the phosphatide-monoglyceride mixture between two liquid phases, especially according to the Craig process with only a single solvent. By it the use in this kind of extraction of phosphatide solvents, for example hexane, which has hitherto been customary, can be avoided. Without addition of a second solvent and without previous addition of monoglycerides, however, an inseparable emulsion would be formed because of the swelling up of the lecithin.

Furthermore, by the process according to the invention, the difficulties which appeared in the concentration by evaporation of alcoholic phosphatide extracts are overcome. Without the presence of monoglycerides there are formed tacky, infusible masses, which adhere to the walls of the distillation apparatus, and the danger is run of overheating, by which its quality is seriously damaged. Attempts have indeed already been made to avoid these difficulties, e.g. by adding higher molecular fatty acids, such as for example oleic acid, or neutral oil, such as for example soyabean oil, to the extracts before the evaporation. However, the former products having the typical fatty acid flavour, give raise to a product with less favourable organoleptic properties, whereas incorporation of a neutral oil give products which on long standing or in the presence of small amounts of water (about 10%) separate into two layers.

In the process according to the invention the alcohol extract can be concentrated in continuous or discontinuous evaporators without danger of deposition. After freeing the products obtained according to the invention from the solvent there are produced homogeneous liquids, which remain stable even after long standing; a separation of layers does not occur in these products even after storage for one year.

The phosphatide fractions prepared according to the invention can be used in very many ways. For example the alcohol-soluble fractions can suitably be used as emulsifier for water-in-oil emulsions as anti-spattering agents in margarine, as emulsifiers for the baking industry, in fedingstuffs and in cosmetic and medicinal preparations; the alcohol-insoluble fractions can suitably be used as emulsifiers for oil-in-water emulsions as well as wetting agents for fat-containing suspensions, for exampe in the chocolate and in the baking-aid and baking industries.

The process according to the invention is more fully illustrated in the following examples, in which the percentages referred to are by weight, unless stated otherwise.

EXAMPLE 1

In a series of tests 100 grams of technical soya lecithin having 66.3% acetone-insolubles and a total content of about 50% lecithins (17.6% choline lecithin and 12.2% cephalin) was stirred at 20° C. with a quantity three times its volume of an alcohol or as the case may be of a mixture of alcohols for from 1 to 20 minutes. Part of the experiments was carried out in the presence, and part in the absence of technical sunflower oil monoglyceride. which contained about 50% of pure monoglyceride. After allowing the extraction mixture to settle the layers obtained were separated. The upper choline lecithin-rich alcoholic layer was then concentrated by evaporation under reduced pressure until free from solvent, the residue weighed and its composition determined by thin layer chromatography.

In the tests with monoglyceride addition, 100 grams of technical soya lecithin were warmed to 50° C. and treated with 10 grams of technical sunflower oil monoglyceride. The mixture was diluted with 30 ml. 90% by volume aqueous ethanol, cooled to 20° C. and stirred with 270 ml. ethanol of the same concentration and at the same temperature. The following table illustrates the action of the monoglyceride addition:

| Extraction agent | 90% (by weight) aqueous ethanol | 95% (by weight) aqueous isopropanol plus 95% (by weight) aqueous methanol (1:1) | | |
|---|---|---|---|---|
| Percent monoglyceride [1] | 0 | 10 | 0 | 10 |
| Percent extract after: | | | | |
| 1 minute stirring | 11.40 | 20.56 | 12.52 | 23.44 |
| 2 minute stirring | 11.60 | 20.90 | 13.43 | 24.56 |
| 5 minute stirring | 14.16 | 22.34 | 14.82 | 25.54 |
| 10 minute stirring | 15.20 | 22.46 | 16.00 | 26.40 |
| 20 minute stirring | 16.22 | 23.16 | 17.62 | 26.40 |
| Efficiency after 20 minutes extraction | 39.2 | 44.4 | 40.6 | 47.7 |
| | 39.2 | | | |
| Analysis of the extract, percent: | | | | |
| Choline lecithin | 42.5 | 33.7 | 40.6 | 31.8 |
| Cephalin | 10.8 | 6.5 | 6.9 | 6.4 |
| Choline lecithin/cephalin | 3.94 | 5.18 | 5.88 | 4.97 |

[1] Amount pure monoglyceride / Total amount lecithins × 100%

EXAMPLE 2

Using a countercurrent extraction apparatus working according to the Craig principle, soya lecithin of the same quality as described in Example 1 was fractionated at 20° C. with 90% by volume ethanol in the volume proportion of 1:3, the lecithin in the first test series containing no monoglyceride and in the second series an addition of 10% of technical sunflower oil monoglyceride containing 50% pure monoglyceride. The following table shows the beneficial influence of the monoglyceride addition on the efficiency of the process.

| Number of steps | Efficiency, percent | Analysis of the extract | | |
|---|---|---|---|---|
| | | Percent choline lecithin | Percent cephalin | Quotient |
| No addition | | | | |
| 1 | 34.0 | 39.9 | 9.7 | 4.11 |
| 2 | 50.0 | 42.3 | 9.5 | 4.45 |
| 4 | 57.3 | 40.2 | 7.4 | 5.45 |
| 6 | 53.2 | 38.8 | 6.1 | 6.36 |
| Addition of 10% monoglyceride | | | | |
| 1 | 37.9 | 30.4 | 7.3 | 4.17 |
| 2 | 45.7 | 24.8 | 5.1 | 4.86 |
| 4 | 59.8 | 23.5 | 3.6 | 6.51 |
| 6 | 81.8 | 27.7 | 6.4 | 4.33 |

EXAMPLE 3

247.5 grams of soya lecithin were mixed at 50° C. with 46.5 grams of a technical sunflower oil monoglyceride preparation which had a content of 48% pure monoglyceride. The mixture was cooled to 20° C. and stirred with 880 ml. of 90% by volume alcohol. After allowing to stand overnight the layers formed were separated and the upper (extract) and the lower (residue), were each concentrated under reduced pressure at 70° C. until free of solvent.

In a similar manner 247.5 grams of the same soya lecithin without addition of monoglyceride was extracted and the fractions obtained worked up.

The results of these tests are given together in the following table, which demonstrates above all the enrichment of the pure monoglyceride in the extract.

| | Starting product | Extract | Residue |
|---|---|---|---|
| Test 1: Soya lecithin plus monoglyceride | | | |
| Weight, grams | 294.0 | 74.0 | 216.0 |
| Addition, grams: | | | |
| Acetone-insoluble | 116.0 | 30.6 | 132.0 |
| Free fatty acid, di- and triglycerides | 105.7 | 29.4 | 75.5 |
| Monoglyceride | 22.3 | 14.0 | 8.5 |
| Total addition | 294.0 | 74.0 | 216.0 |
| Analysis, percent: | | | |
| Choline lecithin (L) | 16.5 | 24.5 | 11.3 |
| Cephalin (C) | 11.8 | 6.1 | 12.1 |
| L:C | 1.4 | 4.0 | 0.9 |
| Efficiency, percent 37.5 | | | |
| Test 2: Soya lecithin | | | |
| Weight, grams | 247.5 | 43.0 | 202 |
| Addition, grams: | | | |
| Acetone-insoluble | 166.0 | 27.0 | 138 |
| Free fatty acid and triglyceride | 81.5 | 16.0 | 64 |
| Total addition | 247.5 | 43.0 | 202 |
| Analysis, percent: | | | |
| Choline lecithin (L) | 19.6 | 38.2 | 13.0 |
| Cephalin (C) | 14.0 | 7.6 | 14.2 |
| L:C | 1.4 | 5.0 | 0.9 |
| Efficiency, percent 33.8 | | | |

What is claimed is:

1. Process for the separation of vegetable phosphatide fractions from a mixture containing choline lecithin and cephalin, which comprises extracting said mixture with a saturated aliphatic alcohol containing from 1 to 3 carbon atoms in the presence of from 5 to 30% by weight of the total amount of phosphatides present in the mixture to be extracted of a monoglyceride which is liquid at the temperature of extraction, thereby providing an improvement in percentage yield of said extracted choline lecithin.

2. Process as claimed in claim 1 wherein the amount of monoglyceride is from 10 to 20% by weight of the total amount of phosphatides present in the mixture to be extracted.

3. Process as claimed in claim 1 wherein the monoglyceride is a monoglyceride wherein from 50 to 100% of the acyl groups are derived from unsaturated fatty acids having a chain length of from 18 to 22 carbon atoms.

4. Process as claimed in claim 1 wherein the monoglyceride is a technical monoglyceride obtained by interesterification of a vegetable oil with glycerol.

5. Process as claimed in claim 1 wherein the extraction mixture also contains a proportion of water not exceeding 20% by volume of the total extraction mixture.

6. Process as claimed in claim 1 wherein the volume ratio of the aliphatic alcohol to the phosphatide mixture to be extracted is from 2:1 to 6:1.

7. A process as claimed in claim 1 in which the extraction is carried out continuously.

8. A process as claimed in claim 7 in which the extraction is carried out as countercurrent distribution process.

References Cited
UNITED STATES PATENTS

| 3,031,478 | 4/1962 | Klenk et al. | 260—403 |
| 2,445,931 | 7/1948 | Beckel et al. | 260—403 |
| 3,325,291 | 6/1967 | Eikermann et al. | 260—403 |

ELBERT L. ROBERTS, Primary Examiner